(12) United States Patent
Steinich

(10) Patent No.: US 8,471,148 B2
(45) Date of Patent: Jun. 25, 2013

(54) LONGITUDINAL WATER BARRIER FOR ELECTRICAL CONDUCTORS

(75) Inventor: Klaus Manfred Steinich, Zorneding (DE)

(73) Assignee: ASM Automation Sensorik Messtechnik GmbH, Moosinning (DE)

( * ) Notice: Subject to any disclaimer, the term of this patent is extended or adjusted under 35 U.S.C. 154(b) by 366 days.

(21) Appl. No.: 12/803,471

(22) Filed: Jun. 28, 2010

(65) Prior Publication Data

US 2011/0155415 A1      Jun. 30, 2011

(30) Foreign Application Priority Data

Sep. 11, 2009  (DE) .................. 10 2009 041 255

(51) Int. Cl.
| | |
|---|---|
| *H01R 4/00* | (2006.01) |
| *H02G 3/06* | (2006.01) |
| *H02G 15/02* | (2006.01) |
| *H02G 3/02* | (2006.01) |
| *H02G 15/08* | (2006.01) |

(52) U.S. Cl.
USPC ............ 174/93; 174/72 C; 174/74 A; 174/76; 174/77 R; 174/84 R; 174/88 R; 174/92

(58) Field of Classification Search
USPC ................. 174/76, 77 R, 84 R, 88 R, 92, 93, 174/72 C, 74 A
See application file for complete search history.

(56) References Cited

U.S. PATENT DOCUMENTS

| | | | | |
|---|---|---|---|---|
| 4,501,927 | A * | 2/1985 | Sievert .............................. | 174/93 |
| 4,710,593 | A * | 12/1987 | Hall et al. .................... | 174/88 R |
| 4,778,948 | A * | 10/1988 | Fitch et al. .................... | 174/88 R |
| 5,146,046 | A * | 9/1992 | Arroyo et al. ............... | 174/23 R |
| 5,231,248 | A * | 7/1993 | Shah ............................... | 174/76 |
| 5,489,751 | A * | 2/1996 | West ............................ | 174/84 R |
| 5,875,547 | A * | 3/1999 | Larsson et al. ................. | 29/869 |
| 5,912,435 | A * | 6/1999 | Elsinger et al. ............ | 174/117 F |
| 6,658,735 | B2 * | 12/2003 | Ito ................................... | 29/868 |
| 2001/0008043 | A1 * | 7/2001 | Daido et al. .................... | 29/834 |
| 2003/0089005 | A1 * | 5/2003 | Caveney ......................... | 40/316 |
| 2007/0215374 | A1 * | 9/2007 | Ichikawa et al. ............ | 174/75 C |

* cited by examiner

*Primary Examiner* — Timothy Thompson
*Assistant Examiner* — Sherman Ng
(74) *Attorney, Agent, or Firm* — Head, Johnson & Kachigian, P.C.

(57) ABSTRACT

For a longitudinal water barrier a conductor is cut at the desired location as usual, the insulation is stripped and the corresponding leads are reconnected with one another in an electrically conductive manner. However, the following steps are taken for additional sealing:
  each lead end is applied to a soldering surface of a circuit board, wherein the soldering surfaces are separated from one another through slots in the circuit board; and,
  subsequently in particular a two step encasement with plastic material is performed over the entire connection portion.

24 Claims, 11 Drawing Sheets

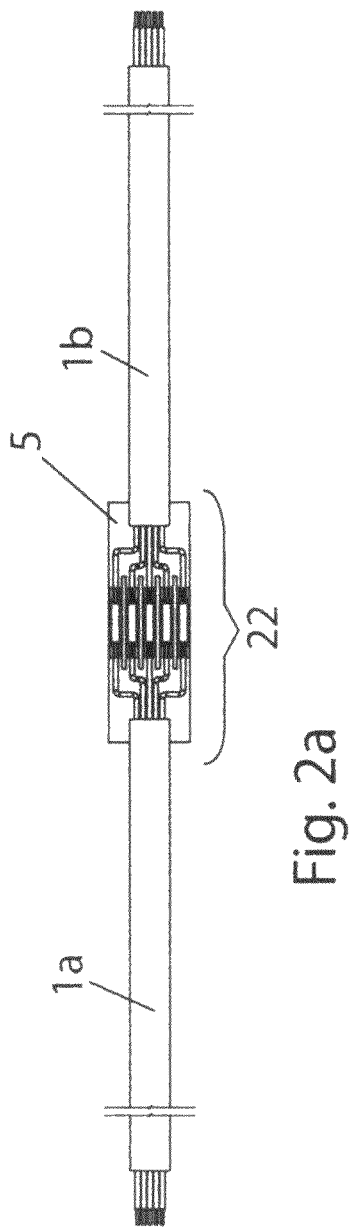
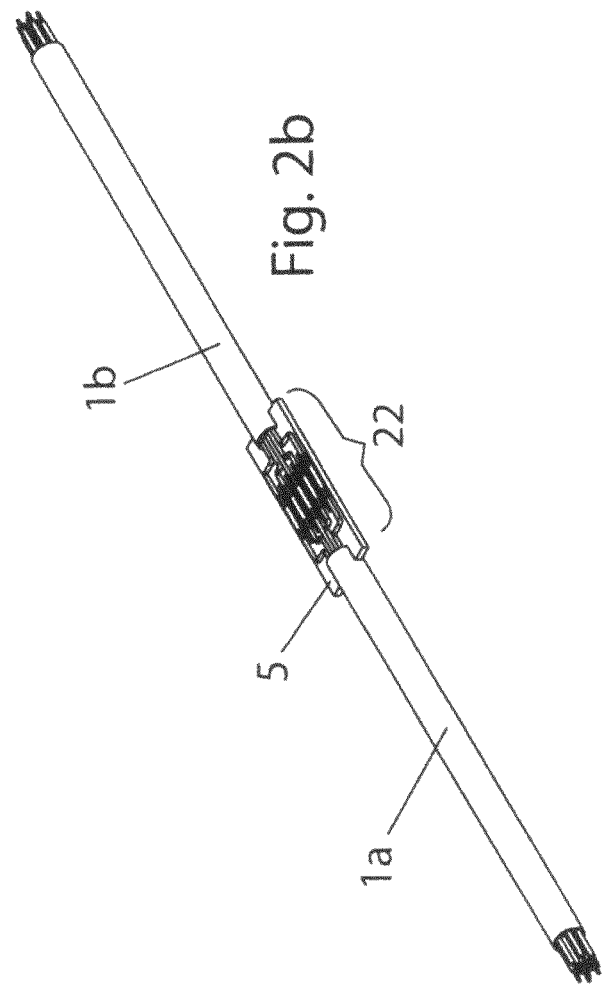

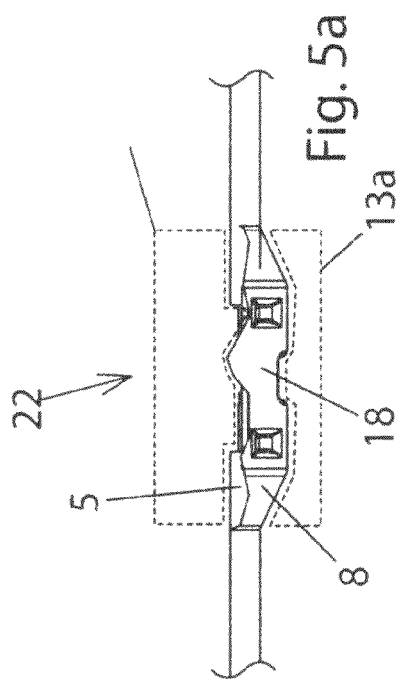
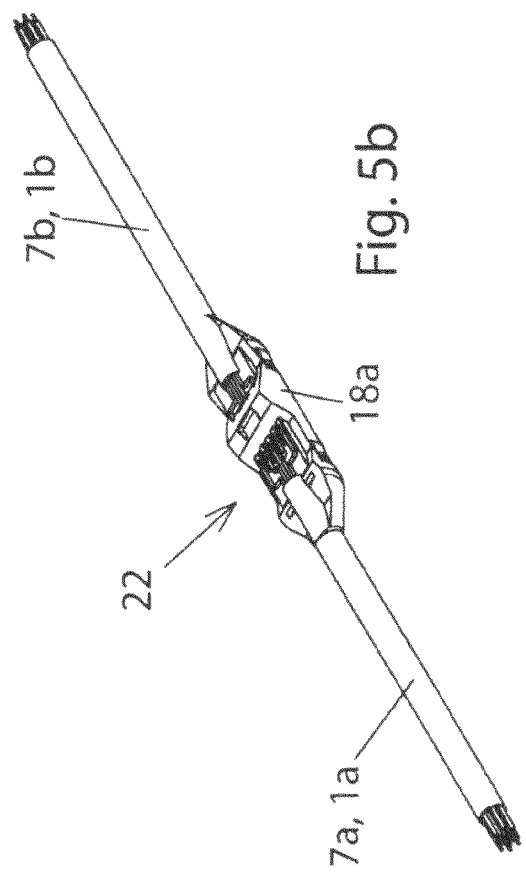

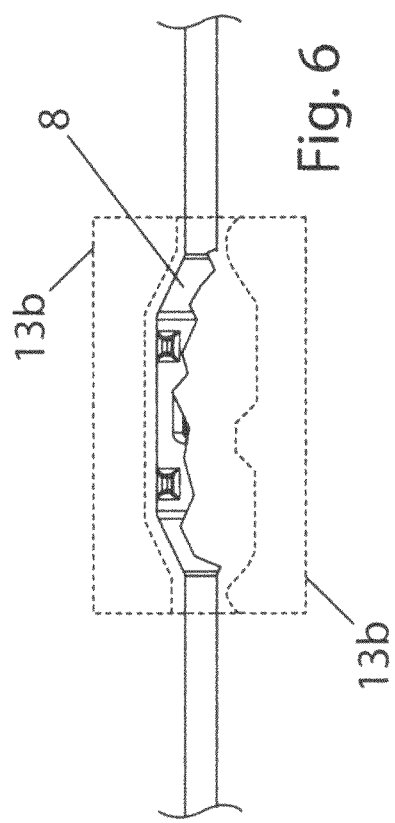
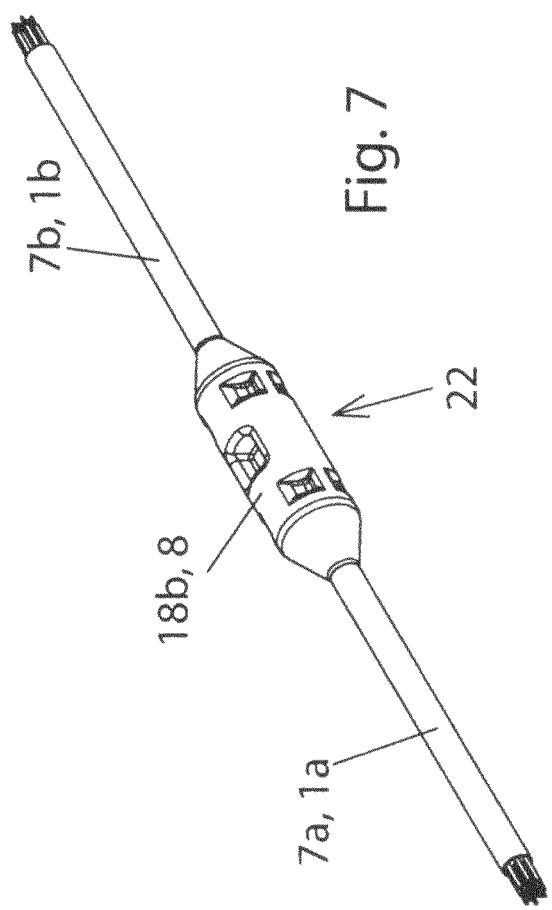

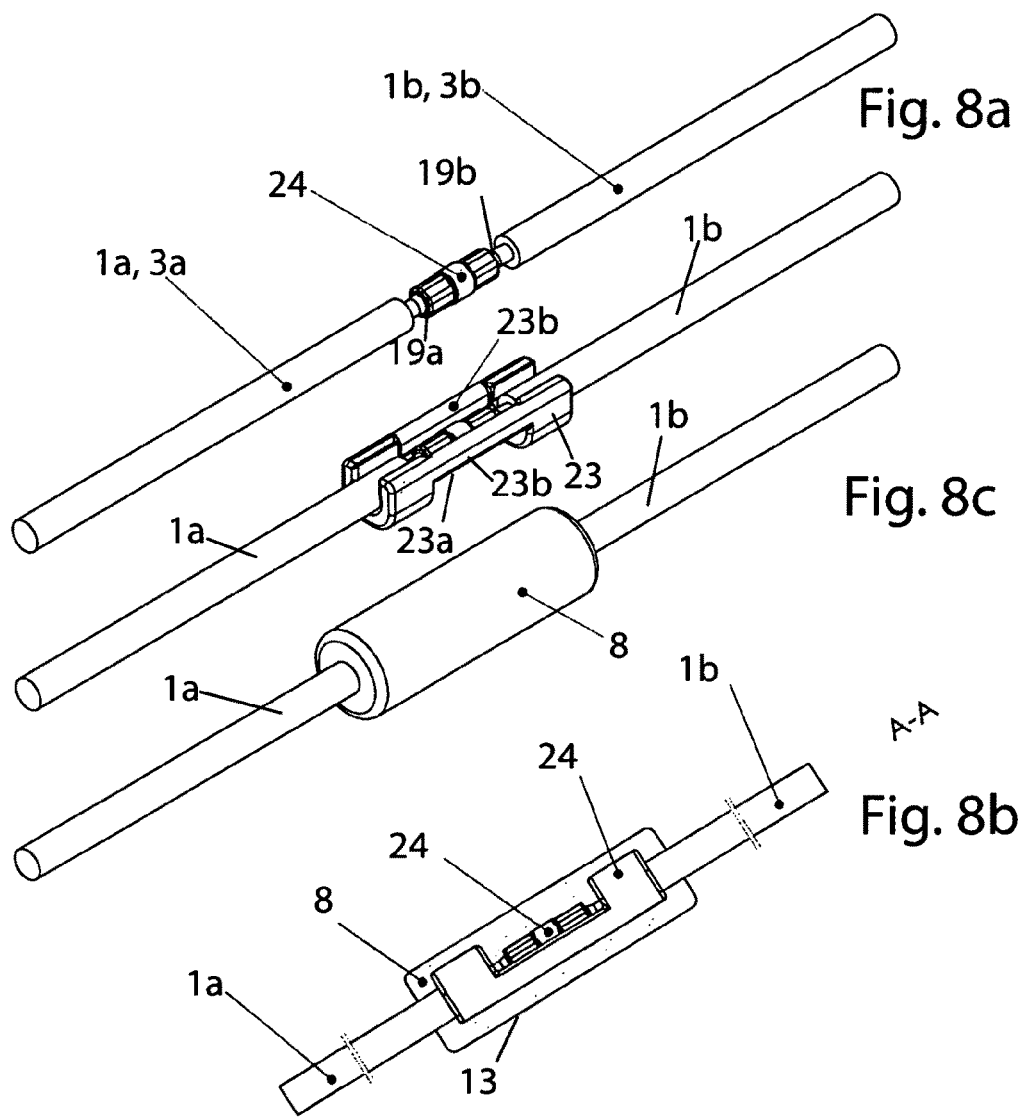

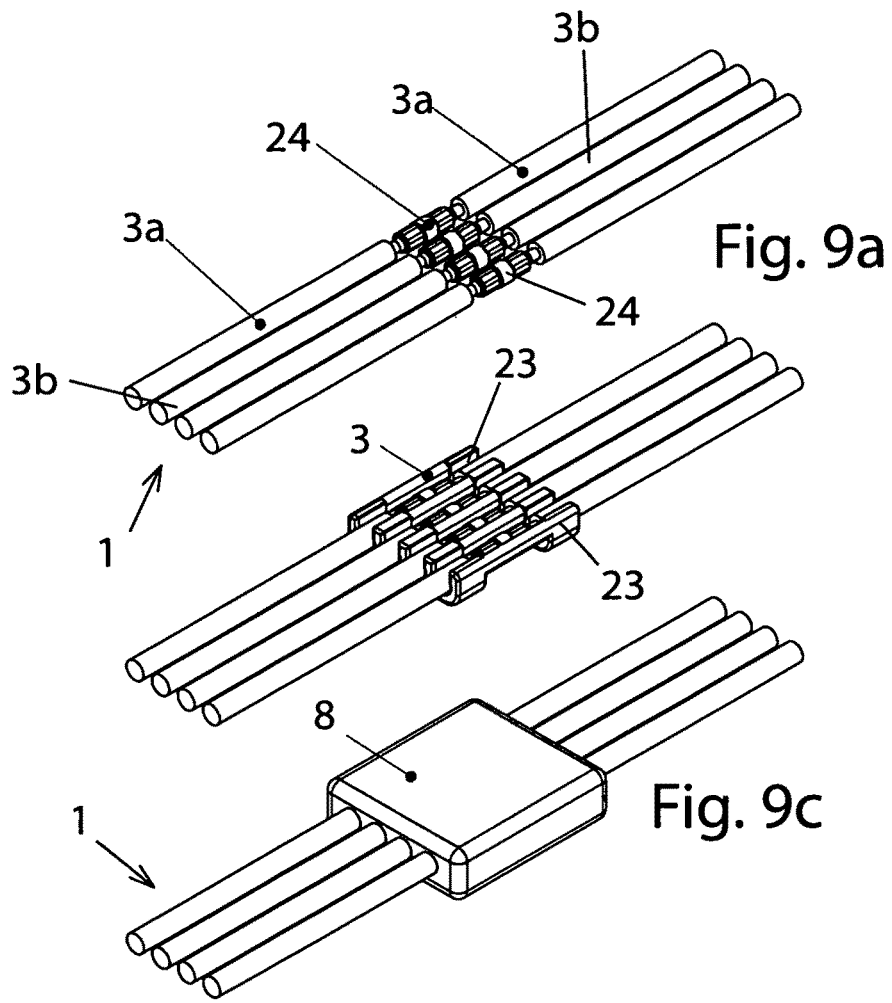
Fig. 9a
Fig. 9c
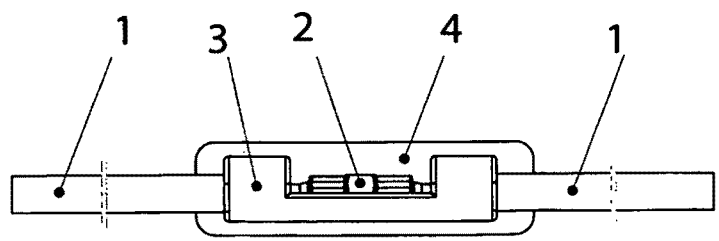
Fig. 9b

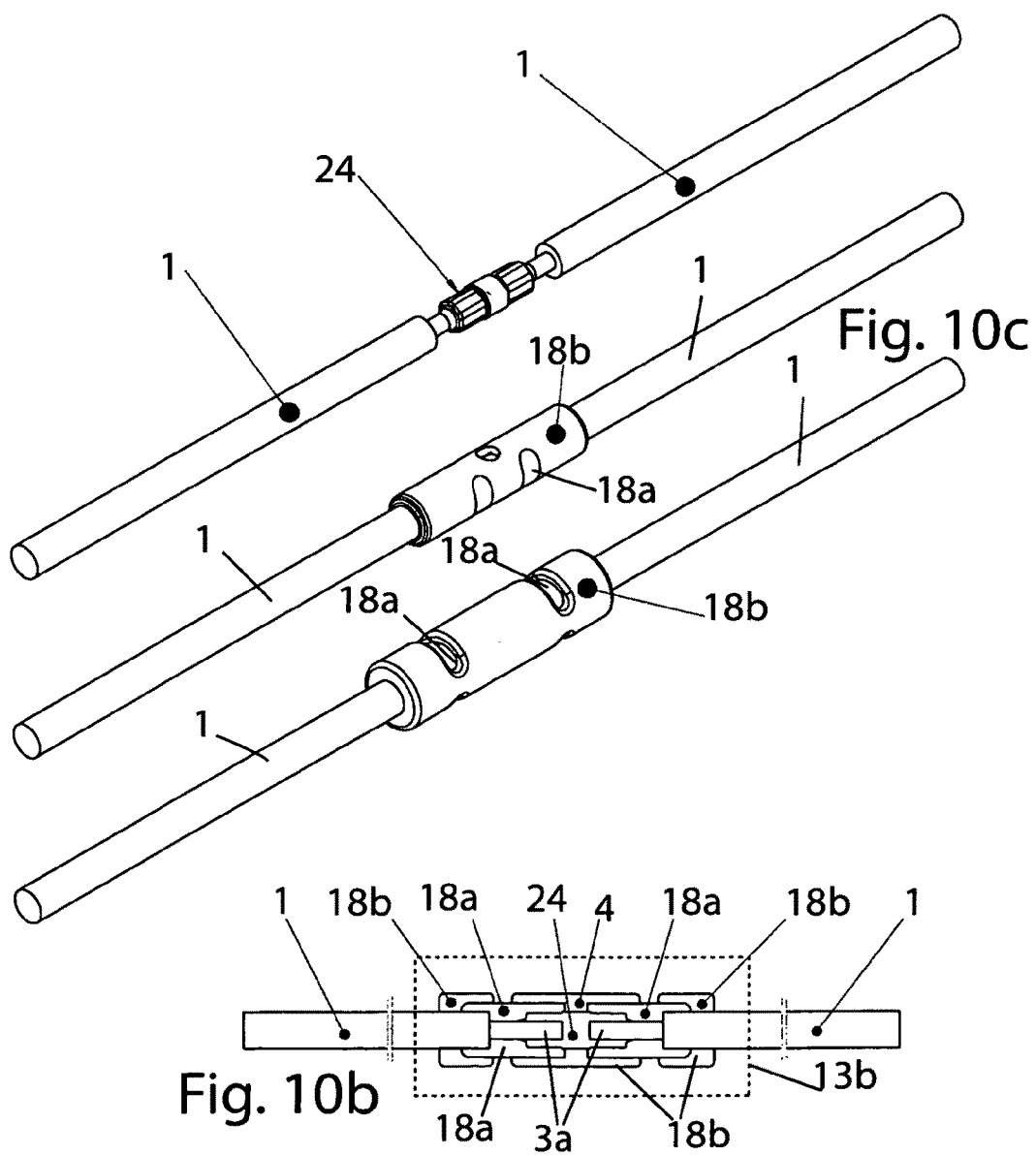

LONGITUDINAL WATER BARRIER FOR ELECTRICAL CONDUCTORS

CROSS-REFERENCE TO RELATED APPLICATIONS

This application claims priority to German Patent Application No. 10 2009 041 255.7 filed Sep. 11, 2009.

FIELD OF THE INVENTION

The invention relates to a longitudinal water barrier for electric measurement- and control conductors.

BACKGROUND OF THE INVENTION

Depending on the location where electrical equipment is being used, there is a risk that water penetrates the equipment through an electric conductor run into a piece of electrical equipment, wherein the water can penetrate forward between a cable jacket and the particular lead insulations through capillary effects and also between the lead insulations and the metal leads themselves, or in the gaps between the strands, if the lead is made from plural particular strands.

When this particular problem persists, it is attempted frequently to provide a longitudinal water barrier in the interior of the piece of electrical equipment, e.g. at the contact point of the electrical cable.

For particularly small pieces of electrical equipment, like e.g. sensors, no sufficient space is provided for this purpose in the interior of the sensor, so that a longitudinal water barrier has to be provided in the course of the conductor and offset from the piece of the electrical equipment.

Thus, several methods are known.

One method includes soldering the blank lead ends together again directly after cutting the electric conductor, which prevents water from penetrating forward within the leads themselves, which are provided in the form of strands, through so called tight soldering.

In order to prevent forward penetration between a lead and a lead insulation and also to prevent an electrical contact between the blank leads, respective shrink tubing is applied to each particular lead and slid over the soldered joint after soldering and shrunk on tight.

Subsequently another shrink tubing is either shrunk on from the conductor jacket of the one conductor end to the jacket of the other conductor end, or the entire connection portion is encased with plastic material, in particular integrally molded or cast, either with a hardening plastic material without external liner, or through providing a housing, into which the non hardening encasement material is introduced.

A similar method is described in DE 3412786 as a longitudinal water barrier in the interior of the housing, in particular in a plug connector.

This method, however, is very labor intensive and thus also prone to cause defects.

DESCRIPTION OF THE INVENTION a) Technical Object

Thus it is the object of the invention to establish a longitudinal barrier as well as a method for its production, wherein the longitudinal barrier can be manufactured in a simple and quick manner and features a high degree of safety against longitudinal water with minimum cost and minimum defect frequency.

b) Solution

The object is accomplished through the features of claims 1, 11 and 14. Advantageous embodiments can be derived from the dependent claims.

The required electrically conductive connection is reestablished for all leads in the conductor by soldering the respective ends of the insulation stripped leads of the cut and insulation stripped conductor onto connecting conductive paths.

Since the soldering surfaces on the conductive paths are in fact arranged on a common circuit board, but offset in transversal direction through slots in the circuit board, which are longer than the soldering surfaces, on the one hand a simple handling during the subsequent encasing, in particular integral injection molding or casting can occur because of the uniform circuit board. On the other hand, however, a short-circuit through a solder joint formed between the soldering surfaces is practically impossible, since the solder joint would have to extend continuously over a long distance in longitudinal direction, namely about the ends of the slots, since the teeth of a soldering comb protrude upward through the slots during soldering.

By soldering the lead ends onto the printed circuit board, also the intermediary space between the strands, in case a lead is made from single strands, is sealed.

Through subsequent complete encasement with plastic material, the ends of the conductor isolation on one side and the ends of the strand isolation on the other side are sealed against longitudinal water exiting at this location.

Since the encasing is preferably not performed in a single step, which would be absolutely possible due to the forced offset of the soldering surfaces from one another due to the common circuit board, it is achieved in at least two steps that the entire connection portion, thus the circuit board with the lead ends, all soldering surfaces and the conductor paths are completely encased by the plastic material.

For a first encasement step the mold is configured, so that the circuit board contacts the mold directly with portions of the circuit board, e.g. with a portion of its bottom side and of its top side and with portions of its faces.

In this condition a partial encasement of the connection portion is performed with plastic material, since the portions of the printed circuit board contacting the mold cannot be covered with plastic material.

In the second encasement step, the connection portion preferably contacts the inner surfaces of the mold for the second encasement step with the already encased and hardened plastic material from the first encasement step, so that those portions of the circuit board which have contacted the mold directly in the first step are henceforth offset from the mold and are completely encased by the plastic material during encasement, in particular injection molding or casting.

On the other hand, the two step encasement process through injection molding has the effect that the circuit board respectively contacts an inner surface of the mold directly in the first encasement step, and contacts the inner surface of the mold indirectly in the second encasement step through the preexisting half encasement indirectly, so that the circuit board is supported and is not mechanically overloaded through the introduction of plastic material under high pressure.

During a one step complete encasement process, the connection portion at the inlets into the mold, however, could only be clamped at the portion of the conductor jacket, which is still intact, in the interior of the mold, however, the printed circuit board would be supported free floating in the mold cavity without contacting the mold.

Due to the plastic material being inserted under pressure, there is a certain risk that the circuit board is pushed against the inner wall of the mold, so that the circuit board contacts the wall with one side and thus, so that the circuit board is not encased by plastic material completely, or that solder joints are even torn off through the mechanical loading.

This can in fact be minimized by selecting the main plane of the circuit board as an insertion direction and by disposing the insertion openings preferably opposite to one another on sides opposing one another, and still this does not provide a completely uniform and simultaneous loading of the circuit board.

Thus, subsequently the electrical conductor is completely encased tight by plastic material in a circumferential manner from the outside of the jacket of the one conductor end to the outside of the jacket of the other conductor end as well as the entire portion in between (connection portion), wherein the plastic material which is injected under pressure or poured in cold contacts the ends of the jacket and the lead insulations and also the blank portions of the leads and the entire circuit board tight and/or without air enclosures.

Thus, longitudinal water arriving at a conductor end, no matter if it penetrates forward between the conductor jacket and the lead insulations or between the lead insulations and the leads, cannot overcome the plastic encasement of the longitudinal water barrier and cannot establish transversal connections between the blank ends of the leads either.

The soldering surfaces are configured as tinned end portions of strip shaped conductor paths, typically made from copper, which are disposed on the top side and possibly also on the bottom side of a circuit board.

The slots which are configured to prevent the formation of solder bridges during soldering thus extend at least over the length of the soldering surfaces between the soldering surfaces.

An extension of the slots over the entire length of the conductor paths is ideal, but this often minimizes the mechanical stability of the circuit board too much for safe encasement in the mold, so that it is typically an optimum compromise to configure the slots approximately over the length of the soldering surfaces and to let them extend slightly beyond the ends of the soldering surfaces in the longitudinal direction of the conductive path.

In case conductive paths and soldering surfaces are only disposed on the one side of the circuit board, thus on the top side, the circuit board is inserted into a form locking device for soldering the lead ends with the soldering surfaces oriented upward, wherein the device includes a soldering comb protruding upward from the base of the device, wherein the teeth of the soldering comb fit exactly through the slots of the circuit board.

In case respective soldering surfaces are configured on the top side and also on the bottom side and the leads in particular of the same electric conductor are to be soldered at this location, this may require two different devices, since the circuit board then has to be positioned at half the cross section height of the electric conductor and also has to end before the intact conductor insulation, thus at the end of the jacket and the jacket has to be positioned in the device in a defined manner.

Subsequently those leads are soldered onto the circuit board in a first device in a first soldering step, wherein the leads are to be soldered to the top side and subsequently the other leads of the electrical conductor are soldered to the bottom side of the circuit board after turning the circuit board over and possibly inserting it into a second device.

BRIEF DESCRIPTION OF THE DRAWINGS

Embodiments of the invention are subsequently described in more detail with reference to the drawing figure wherein:

FIG. 5: illustrates a first encasement step;

FIG. 6: illustrates a second encasement step;

FIG. 7: illustrates a finished longitudinal water barrier;

FIG. 8: illustrates a reestablished crimped electrical connection with one leaded;

FIG. 9: illustrates a reestablished crimped electrical connection with plural leads, and;

FIG. 10: illustrates the solution of FIG. 8 with encasements in plural steps.

DETAILED DESCRIPTION OF THE PREFERRED EMBODIMENTS OF THE INVENTION

Figure 1A:
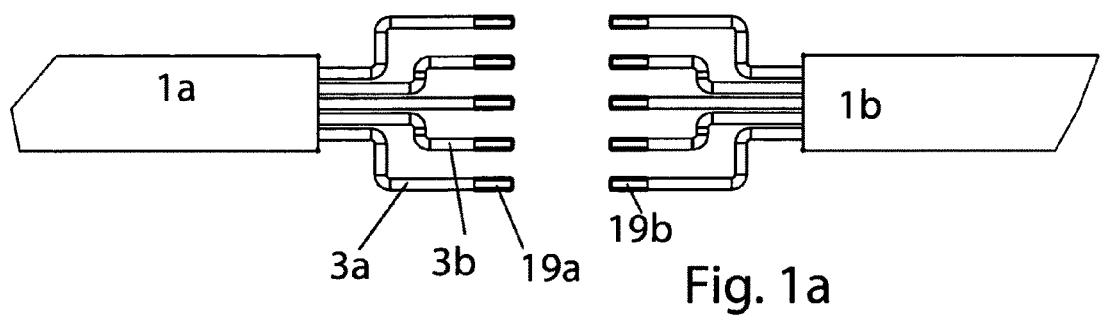
FIG. 1: illustrates a cut electric conductor and a circuit board.

FIG. 1a illustrates the electrical conductor 1, which is cut at the desired location, wherein the jacket 7a, b of the electrical conductor is already removed over a certain length at the conductor ends 1a, b, so that the individual leads 3a, b protrude out of the jacket 7a, b, wherein also the ends of the individual leads in their end portions are stripped from the lead insulation and the strands 19a, b are exposed.

Figure 1B:
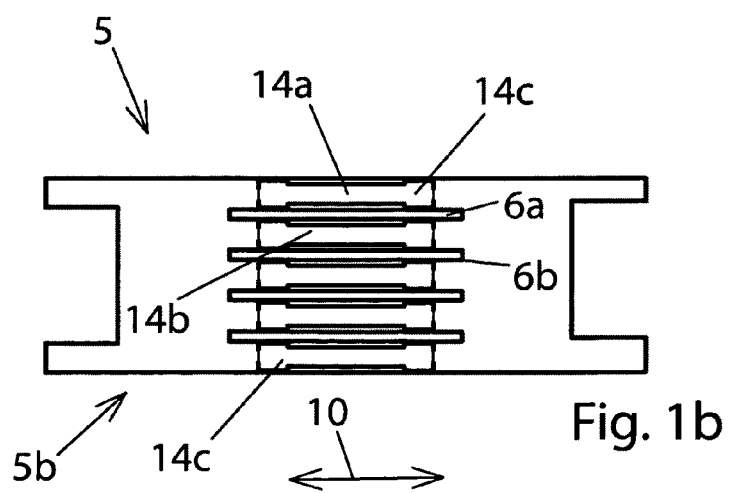

FIGS. 1b through 7 illustrate the longitudinal water tight connection through soldering on the circuit board:

FIG. 1b illustrates the circuit board 5 separately, wherein the circuit board is configured elongated rectangular and includes plural conductor paths 14a, b extending parallel and adjacent to one another with an offset, wherein the ends of the conductor paths oriented away from one another are respectively configured as tinned soldering pads 14c.

Slots 6a, b are provided respectively between the individual conductor paths 14a, b . . . , wherein the slots extend in longitudinal direction 10 and parallel to the conductor paths and protrude in longitudinal direction beyond the length of the soldering surfaces 4a, b, but the slots are either discontinued (not illustrated) in the center portion of the conductor paths 14a, b or they extend over the total length of the conductor paths and even they protrude beyond the ends of the conductor paths in longitudinal direction, as illustrated in FIG. 1b.

In FIG. 1a the individual leads 3a, b are already placed at an offset from one another with their ends, which is identical to the offset of the soldering pads 14c on the circuit board 5. The circuit board 5 is subsequently received in the soldering device 15 in a form locked manner according to FIG. 4a, wherein the corner portions of the circuit board contact the soldering device and the circuit board is supported form locked in longitudinal direction 10 as well as transversal direction 11 and the soldering device includes a cable channel 21, whose base is disposed lower than the contact surfaces 15a, b for the corner portions, and which continuously extends in longitudinal direction 10 for receiving the conductor ends 1a, b to be run to the circuit board 5.

The teeth 12a, b of a soldering comb 12 protrude from the center of the base of the soldering device 15, wherein the teeth of the soldering comb are sized, so that they protrude through the slots 6a, b of the circuit board 5 when the circuit board is inserted into the soldering device 15 and namely protrude significantly beyond the top side of the circuit board 5, thus substantially filling the slots 6a, b.

Figure 4A:
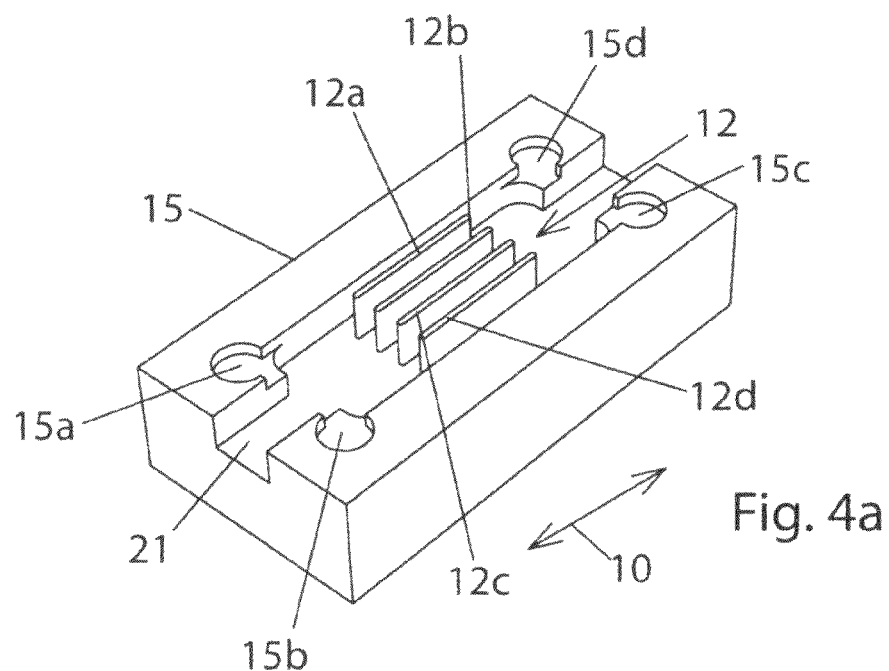
FIG. 4: illustrates soldering on the circuit board.
Figure 4B:
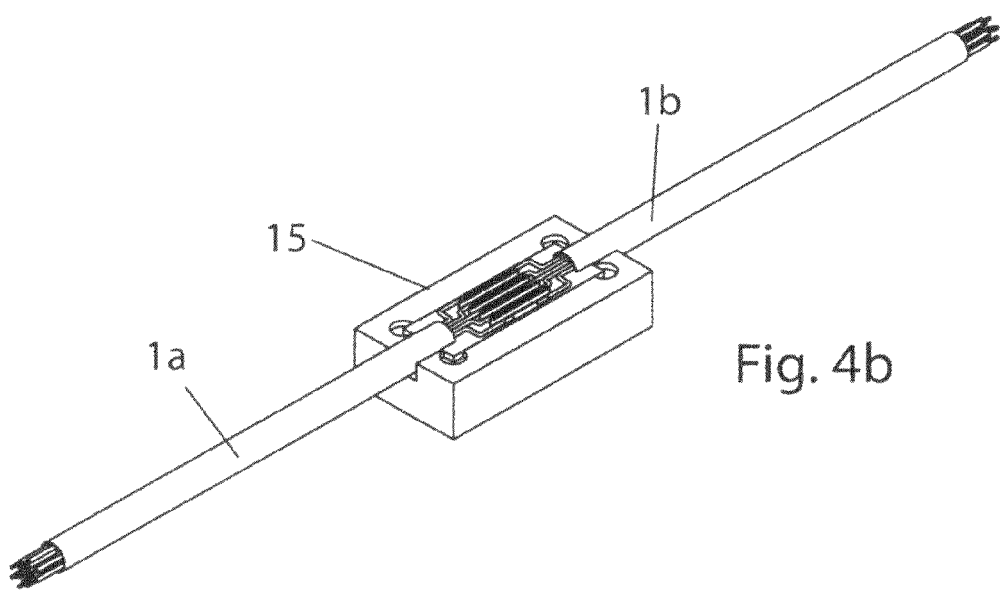

Subsequently, the stripped lead ends 3a, b, initially the ends of the one conductor end 1a, are placed onto top side of the soldering pads 14c at one the end of the conductor paths 14a, b and soldered there, and subsequently the lead ends 3a, b of the other conductor end 1b are placed onto the other soldering pads 14c at the other ends of the conductor paths 14a, b (FIG. 4b).

Thus the teeth 12a, b of the soldering comb 12 protruding beyond the circuit board prevent an unintentional forming of bridges in transversal direction 11 between the individual adjacent soldering pads 14c during soldering and thus causing a short circuit between the leads 3a, b.

Thus, the depth of the cable channel 21 is typically sized, so that the circuit board 5 is disposed at half the height of the cross section of the conductor 1, which is always necessary when leads are not only soldered on the top side 5a of the circuit board 5, but when conductor paths 14a, b with soldering pads 14c are also disposed on the bottom side 5b of the circuit board and leads are also soldered at this location in a second step after turning the circuit board 5 over, which is typically the case when the conductor includes a larger number of leads, e.g. more than four or five leads.

Figure 2C:
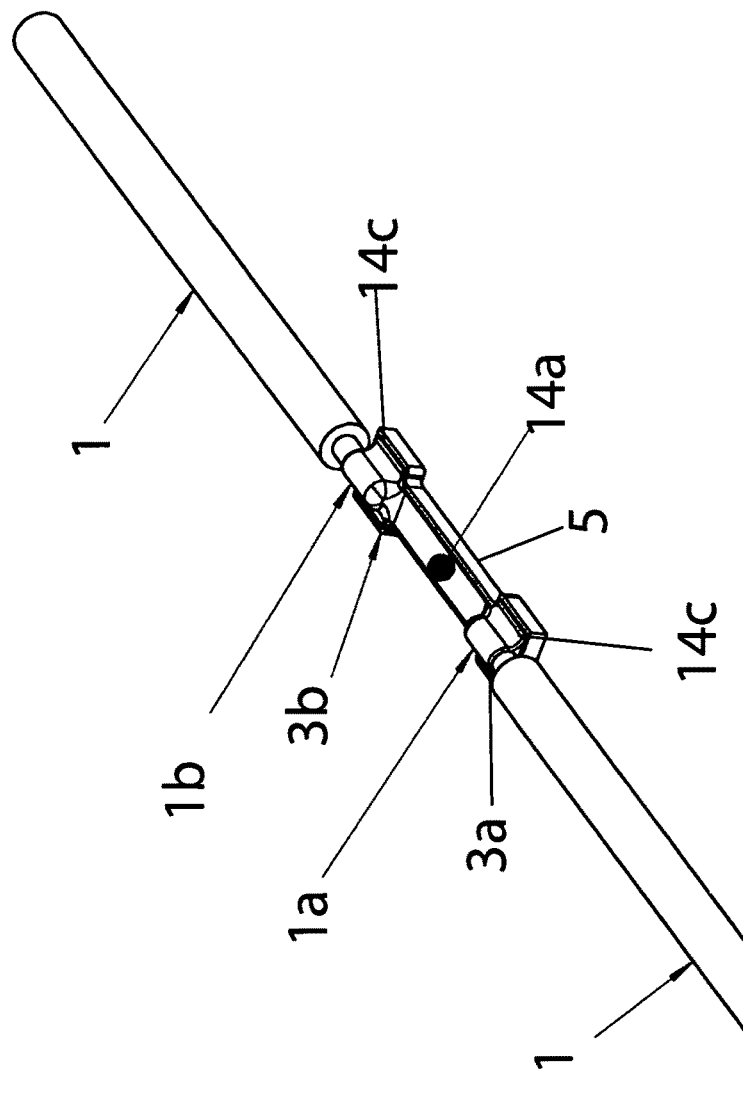
FIG. 2: illustrates a reestablished soldered electric connection.
Figure 3A:
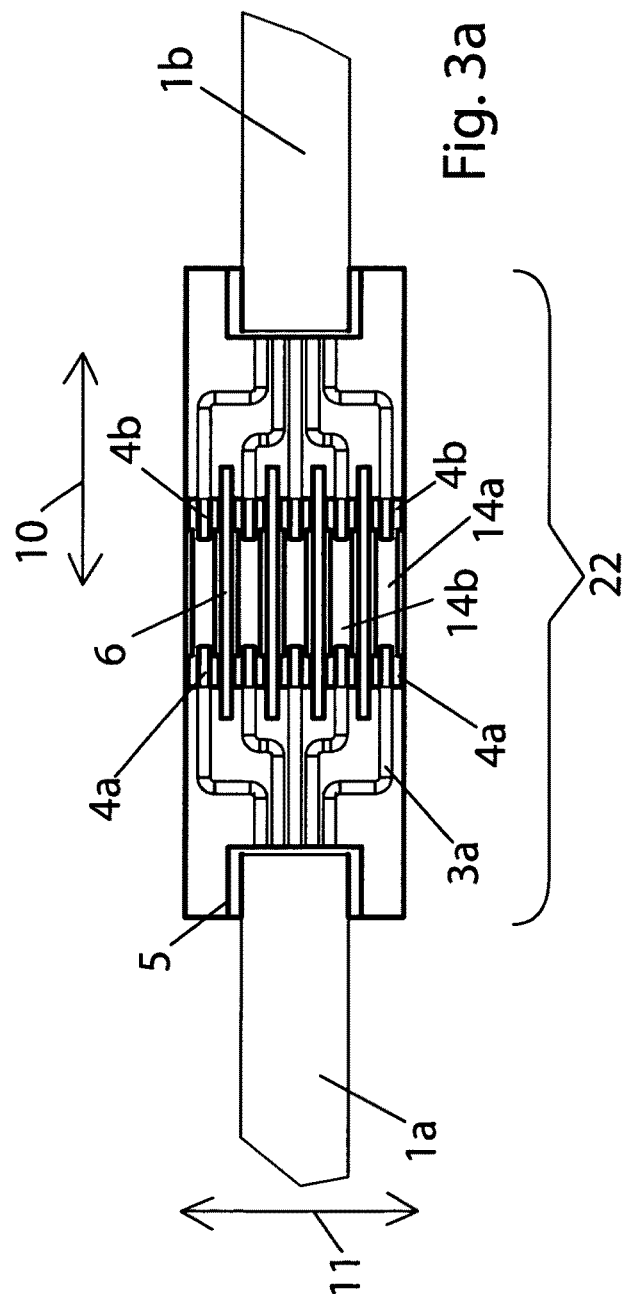
FIG. 3: illustrates an enlarged detail of FIG. 2.
Figure 3B:
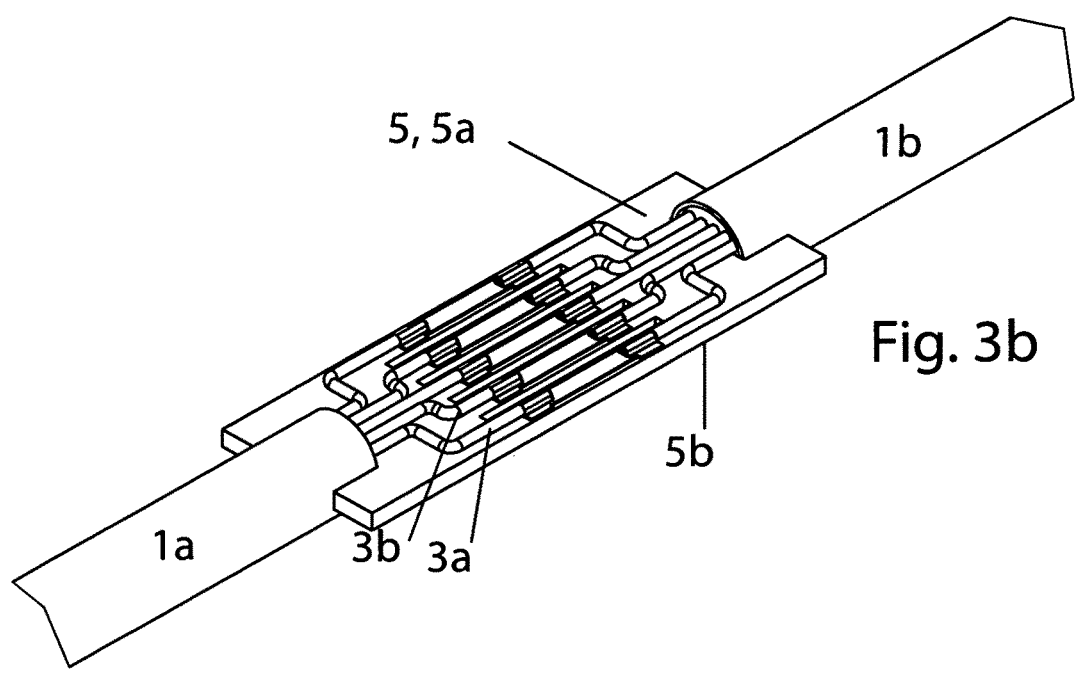

Now on the one side, the electrical connection in the conductor 1 is reestablished and at the same time, clearances in the strands 19a, . . . themselves, thus between the individual wires of the strands, are closed through soldering as illustrated in FIGS. 2a, b and in enlarged details in FIGS. 3a, b.

Furthermore FIG. 2c illustrates an analogously reestablished one-leaded electrical connection, in which accordingly only a single conductor path 14a is provided on the circuit board 5, wherein the leads 3a, b corresponding to one another are soldered at the two soldering pads 14c at the ends of the conductor path.

Thus, in order to preclude all other possibilities for the longitudinal water to penetrate forward in the conductor 1, the entire connection portion 22, thus from the jacket 7a of the one conductor end 1a to the jacket 7b of the other conductor end 1b, is tightly encased with plastic material in a two step encasement procedure.

For this purpose, the completely soldered connection portion 22 according to FIGS. 2a and 3a is placed into a first mold 13a in a first encasement step, as indicated in FIG. 5a, so that the circuit board 5 contacts the inner surfaces of the mold 13a directly with partial portions of the surface of the circuit board and is supported in the mold in a defined form locked manner.

The circuit board 5 is tightly encased by plastic material 8 in the portions where the circuit board does not contact the inside of the mold 13a, but where cavities were disposed there in between, by subsequently introducing curable plastic material 8, and of course also the conductor ends 1a, b which are disposed in this portion as well as the end of the jacket 7a, b, which is also still disposed inside the mold 13a are tightly encased by curable plastic material, so that the first encasement 18a according to FIG. 5a is provided after curing and removal from the mold 13a.

Subsequently, the connection portion 22 thus partially encased with the first encasement 18a as illustrated in FIG. 5b is inserted into a second mold 13b according to FIG. 6, which has a different inner contour and is configured, so that the plastic material 8 of the first encasement 18a now contacts the inside of the second mold 13b and, so that portions of the circuit board 5, of the leads 3a, . . . and of the jacket 7a, . . . , which are not yet encased by the plastic material, are on the other hand side offset from the inner surface of the mold 13b and are now being covered by the plastic material 8 of the second encasement 18b in the second encasement step.

Thus, the entire connection portion 22 is now encased by the plastic material 8 of the two encasements 18a, b tightly and without gaps as illustrated in FIG. 7.

Still, the circuit board 5 either contacts the inside of the mold 13a or 13b in each of the two encasement steps directly like in the first encasement step, or indirectly through the cured plastic material 8 of the first encasement 18a, and is only loaded lightly during encasement.

The FIGS. 8 through 10 illustrate embodiments, wherein the corresponding leads 3a, b, . . . of the conductor ends 1a, b of an electrical conductor 1 are not connected to one another in an electrically conductive manner through soldering to a circuit board, but are being connected through an illustrated crimp sleeve 24.

As illustrated in FIG. 8a, upper depiction for a lead 3a,b of a one lead conductor 1a, b, the insulation stripped strand 19a,b is respectively inserted into one of the two crimping openings of the crimp sleeve 24 disposed opposite to one another, wherein the crimping openings are connected with one another in an electrically conductive manner through a metal bar or a sleeve or through a cylindrical rod, preferably integrally connected, and the strands are connected to the ends of the crimp sleeve in a mechanically loadable and electrically conductive manner through the crimping process, thus through pressing the crimping openings in a radially inward direction.

The reestablished electrical connection is now inserted into a receiver component 23, which is typically made of a plastic material (lower depiction in FIG. 8a), wherein the receiver is used as a positioning device during the subsequent encasement with the plastic material 8.

Thus, the receiver 23 is configured U-shaped in cross section with a cavity, into which the electrical conductor 1 fits closely. The length of the receiver is greater than the distance between the ends of the respective jacket 7a, b and a recess 23a is provided in the base of the U-shape, wherein the length of the recess corresponds at least to the length of the crimp sleeve 24, better corresponds to distance of the ends of the jacket 7a, b.

The U-shapes at the two ends are only connected with one another by two remaining longitudinal bars 23b of the receiver 23.

Thus, a mold 13 (FIG. 8b) can be used for the subsequent encasement, wherein the receiver 23 with the inserted crimped electrical conductor 1a,b can be placed into the mold cavity tight fitting and, so that it is positioned in all three spatial directions and the connection portion 22 of the conductor 1 is still accessible for the plastic material 8 from all sides, which prevents the longitudinal bars 23b from contacting the crimp sleeve 24.

Thus, the encasement with the plastic material 8 can be performed in one encasement step, which causes a mechanical load on the crimp sleeve 24 during the introduction of the plastic material, wherein the crimp sleeve is freely suspended in the receiver 23 and thus also in the mold 13, however the crimped crimp sleeve 24 can bear a higher mechanical load than a circuit board 5 configured as a connection component.

Also here, the plastic material 8 extends on all sides about the connection portion 22 and extends longitudinally from the jacket 7a to the jacket 7b.

FIG. 9 illustrates an analogous method for an electric conductor 1 with plural leads 3a, b . . . , which are then crimped one by one preferably also in particular in double crimp sleeves 24 according to FIG. 8 and which are subsequently inserted e.g. in singular or connected receivers which are disposed adjacent to one another or in a star shape in cross section and which are subsequently jointly encased in a single block made out of plastic material 8 (FIG. 9*c*).

It is apparent that the handling becomes more difficult for an increasing number of strands, than for the soldering solution according to FIGS. 1 through 7.

The FIG. 10 illustrate a two step encasement process for a one-lead conductor 1 according to the crimping method according to FIG. 8*a*, upper depiction, wherein, however, a separate receiver can be omitted.

As illustrated best in FIG. 10*b*, a first mold, which is not illustrated, contacts the circumference of the crimp sleeve 24 while the first encasement 18*a* is formed, the mold contacts the crimp sleeve e.g. in its center portion and also contacts the outer circumference of the jacket 7*a,b* of the conductor 1.

Thus the strand 3*a, b* and the ends of the crimp sleeve 24 and the ends of the respective jacket 7*a, b* are completely encased while the first encasement 18*a* is formed.

After hardening, the first encasement 18*a* is inserted into a second mold 13*b* and thus acts as a positioning device therein, in that the first encasement 18*a* contacts an inner surface of the second mold 13*b* at least with portions of the first encasement, so that the first encasement is positioned therein in a form locked manner in all three spatial directions.

Contrary to that, the surface portions of the connection portion 22, which are not wetted by plastic material 8 in the first encasement step, in particular e.g. the center longitudinal portion of the crimp sleeve 24 and also the transitions of the faces of the first encasement 18*a* into the circumferential surface of the jacket 7*a,b*, are open for the second encasement 18*b*, which has in particular a larger diameter than the first encasement 18*a* and is disposed concentric to the first encasement.

What is claimed is:

1. An electrical conductor (1) with a longitudinal water barrier (2), which comprises:
    conductor ends (1*a*, . . . ) corresponding to one another and to be connected with one another, of the at least one cut and insulation stripped lead (3*a*, . . . ) of the conductor (1) are connected with one another in an electrically conductive manner; and the entire connection portion (22) from the jacket (7*a*) of the one conductor end (1*a*) to the jacket (7*b*) of the other conductor end (1*b*) is encased by plastic material (8); and
    wherein plural conductor paths (14*a, b*) are applied to a common circuit board (5), so they are adjacent to one another and offset from one another in transversal direction (11) of the conductor (1), slots (6*a, b*) are disposed in the circuit board (5) between the conductor paths (14*a, b*), wherein the slots extend in particular in at least one longitudinal direction (10) beyond the ends of the conductor paths (14*a, b*).

2. The electrical conductor (1) according to claim 1, wherein the at least one insulation stripped lead (3*a*) of the corresponding opposing conductor ends (1*a, b*) to be connected with one another is soldered to ends of a respective strip shaped conductor path (14*a*, . . . ) configured as soldering pads (14*c*).

3. The electrical conductor (1) according to claim 1, wherein the slots (6*a, b*) extend from the top side (5*a*) to the bottom side (5*b*) of the circuit board (5).

4. The electrical conductor (1) according to claim 1, wherein the slots (6*a, b*) extend in longitudinal direction (10) on both sides beyond the ends of the conductor paths (14*a, b*), but the slots are provided in particular in the portion of the conductor path (14*a, b*) between the soldering pads (14*c*).

5. The electrical conductor (1) according to claim 1, wherein the slots (6*a, b*) extend in longitudinal direction (10) over the length of the entire conductor path (14*a, b*) and in particular extend beyond the ends of the conductor path in both directions.

6. The electrical conductor (1) according to claim 1, wherein the conductor paths (14*a, b*) are disposed on the top side (5*a*) and also on the bottom side (5*b*) of the circuit board (5) and the leads (3*a, b*) of a conductor (1) are partially soldered on the top side (5*a*) and partially soldered on the bottom side (S*b*) of the same circuit board (5).

7. The electric conductor (1) according to claim 1, wherein the conductor ends (1*a, b*) of one respective insulation stripped lead (3*a, b* . . . ) are crimped to the ends of a crimp sleeve; each crimped conductor is separately inserted into a receiver acting as a spacer and made from the plastic material (8); and the receiver (23) with a crimped portion is encased by the plastic material (8) from a jacket (7*a*) of the one conductor end (1*a*) to a jacket (7*b*) of the other conductor end (1*b*) including the receiver (23), in particular through casting or injection molding.

8. The electrical conductor (1) according to claim 7, wherein the crimped connection portions of plural leads (3*a, b*, . . . ) are inserted adjacent to one another into a receiver (23') with plural receiver portions adjacent to one another and are jointly encased with the plastic material (8).

9. The electric conductor (1) according to claim 8, wherein the encasement through plastic material comprises an inner plastic material portion and an outer plastic material portion, which are produced in a time sequence one after the other.

10. A method for producing an electrical conductor (1) with a longitudinal water barrier (2) as set forth in claim 1, comprising the following method steps:
    cutting the conductor (1) at the position provided for the longitudinal water barrier (2); removing the jacket (7*a, b*) in the respective end portion; removing the lead insulations (9*a, b* . . . ) from the particular leads (3*a, b*) in the respective end portions;
    connecting the corresponding leads (3*a, b*) of the two conductor ends (1*a, b*) in an electrically conductive manner, in particular through soldering or crimping;
    encasing the connection portion (22) with plastic material (8) from the jacket (7*a*) of the one conductor end (1*a*) to the jacket (7*b*) of the other conductor end (1*b*) in particular through casting or injection molding, wherein the corresponding ends of leads (3*a, b*) are connected with one another by soldering them or crimping them to the opposite ends of a strip shaped conductive path (14*a, b*) configured as soldering paths (14*c*), which are in particular disposed adjacent to one another and offset from one another on a common circuit board (5) and which are separated from one another through slots (6*a, b*) in the circuit board (5); the circuit board (5) with the connected conductor ends (1*a, b*) is inserted into a mold (13) and the entire connection portion (22) from the jacket (7*a*) of the one conductor end (1*a*) to the jacket (7*b*) of the other conductor end (1*b*) is tightly encased with plastic material (8), in particular through casting or injection molding.

11. The method according to claim 10, wherein the soldering is performed through inserting the circuit board (5) into a device receiving the circuit board (5) in a form locking manner, the device comprising a soldering comb (12), whose teeth (12*a, b*) pass through the circuit board (5) through the slots (6*a, b*) and separate the soldering surfaces (4*a, b*) from one another.

12. The method according to claim 10, wherein the soldering and crimping of the ends of the leads (3a, b) is performed for the first leads initially on the top side 5a of the circuit board (5) and subsequently for the other leads (3x, y . . . ) on the bottom side (5b) of the circuit board (5) and different devices (15) are being used for inserting the circuit board (5).

13. A method for producing an electrical conductor (1) with a longitudinal water barrier (2) as set forth in claim 7, comprising the following method steps:
cutting the conductor (1) at the position provided for the longitudinal water barrier (2); removing the jacket (7a, b) in the respective end portion; removing the lead insulation (9a, b . . . ) from the particular leads (3a, b) in the respective end portions;
connecting the corresponding leads (3a, b) of the two conductor ends (1a, b) in an electrically conductive manner, in particular through soldering or crimping; and
encasing the connection portion (22) with plastic material (8) from the jacket (7a) of the one conductor end (1a) to the jacket (7b) of the other conductor end (1b), in particular through casting or injection molding, wherein the corresponding ends of the leads (3a,b) are connected with one another by crimping them with the ends of a double crimp sleeve 24; the crimped crimp sleeve (24) is inserted into a recess of a receiver (23) made of plastic material; and the entire connection portion (22) from the end of the jacket (7a) to the end of the jacket (7b) including the receiver (23) is completely encased with plastic material (8), in particular through casting or injection molding.

14. The method according to claim 13, wherein for an electrical conductor with plural leads (3a, h), the particular crimped crimp sleeves (24) are respectively inserted into a recess of the receiver, which functions as a spacer; and the entire receiver (23') is encased with plastic material (8).

15. A method according to claim 13, wherein encasing the connection portion (22) through plastic material (8) is performed in a single encasement step.

16. The method according to claim 13, wherein encasing the connection portion (22) is performed in two encasement steps performed subsequent to one another in particular in separate molds (13a, b).

17. The method according to claim 16, wherein portions of the circuit hoard (5) or of the crimp sleeve (24) are positioned in partial portions very close to the inside of the mold (13a) in a first encasement step, in particular contacting the inside of the mold (13a).

18. The method according to claim 16, wherein the circuit board (5) or the crimp sleeve (24) partially contact the inner surface of the first mold (13a) with their narrow sides in a first encasement step.

19. The method according to claim 16, wherein the plastic material (8) applied in the first encasement step contacts the inside of the second mold (13b) in the second encasement step and the circuit board (5) or the crimp sleeve (24) do not contact the inner surface of the second mold (13b) directly at any location.

20. The method according to claim 16, wherein the insertion openings (16a, b) are located at the level of the circuit board (5) at least for one of the encasement steps and the insertion direction (17) is selected in the direction of the main plane (20) of the circuit board (5).

21. The method according to claim 16, wherein the same plastic material (8) is selected as an encasement material for the first and for the second encasement step.

22. The method according to claim 16, wherein different plastic materials are selected for the two encasement steps.

23. The method according to claim 16, wherein a well bonding and soft plastic material is used for the first encasement step and a hard and tough plastic material is used for the second encasement step.

24. An electrical conductor (1) with a longitudinal water barrier (2), which comprises:
conductor ends (1a . . . ) corresponding to one another and to be connected with one another, of the at least one cut and insulation stripped lead (3a, . . . ) of the conductor (1) are connected with one another in an electrically conductive manner; and the entire connection portion (22) from the jacket (7a) of the one conductor end (1a) to the jacket (7b) of the other conductor end (1b) is encased by plastic material (8);
wherein the conductor ends (1a, b) of one respective insulation stripped lead (3a, b . . . ) are crimped to the ends of a crimp sleeve; each crimped conductor is separately inserted into a receiver acting as a spacer and made from the plastic material (8); and the receiver (23) with a crimped portion is encased by the plastic material (8) from a jacket (7a) of the one conductor end (1a) to a jacket (7b) of the other conductor end (1b) including the receiver (23), in particular through casting or injection molding; and
wherein the crimped connection portions of plural leads (3a, b, . . . ) are inserted adjacent to one another into a receiver (23') with plural receiver portions adjacent to one another and are jointly encased with the plastic material (8).

* * * * *